March 30, 1943.  G. J. SELLMEYER  2,315,458
WORK GUIDE FOR SAW TABLES
Original Filed Dec. 6, 1940
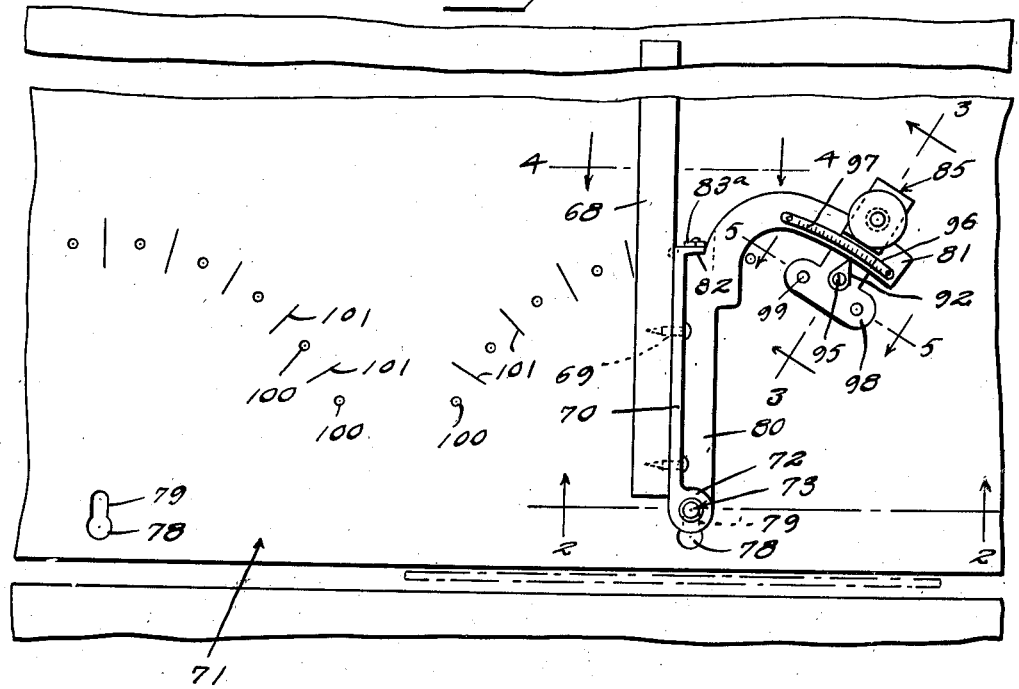
Inventor
G. J. Sellmeyer
By Kimmel & Crowell
Attorneys Patented Mar. 30, 1943

2,315,458

UNITED STATES PATENT OFFICE 2,315,458

WORK GUIDE FOR SAW TABLES

Gilbert J. Sellmeyer, Indianapolis, Ind.

Original application December 6, 1940, Serial No. 368,928. Divided and this application June 11, 1941, Serial No. 397,600

2 Claims. (Cl. 143—169)

This invention relates to work guides or fences for saw tables and is an improvement over the work guide structure embodied in my co-pending application, Serial Number 329,776, filed April 15, 1940, and it is also a division of my co-pending application, Serial Number 368,928, filed December 6, 1940.

An object of this invention is to provide an improved work guide for a saw table which may be shifted transversely of the table and readily secured in adjusted position.

Another object of this invention is to provide a work guide or fence which is so constructed that a portion thereof may be angularly adjusted with respect to the remainder of the guide, the guide also including means whereby it may be firmly secured relative to the saw table so as to thereby prevent shifting or bending of the guide relative to the table during the use thereof.

A further object of this invention is to provide a work guide of this kind which can be shifted to different positions with respect to the saw table and locked in its shifted or adjusted position.

A further object of this invention is to provide a work guide of this kind in the form of a protractor with a vernier calibration by means of which the adjustable portion of the guide may be finely adjusted to the desired angle and then locked or clamped in its finely adjusted position.

To the foregoing objects and to others which may hereinafter appear, the invention consists of the novel construction, combination and arrangement of parts as will be more specifically referred to and illustrated in the accompanying drawing wherein are shown embodiments of the invention, but it is to be understood that changes, variations and modifications may be resorted to which fall within the scope of the invention as claimed.

In the drawing:

Figure 1 is a fragmentary top plan view of a saw table illustrating the adaptation therewith of a work guide or fence in accordance with this invention, Figure 2 is a section on line 2—2 of Figure 1, Figure 3 is a section on line 3—3 of Figure 1, Figure 4 is a section on line 4—4 of Figure 1, and Figure 5 is a section on line 5—5 of Figure 1.

Referring to the drawing the numeral 71 generally indicates a saw table which is provided with a saw slot extending lengthwise thereof in which a saw is adapted to be moved. The saw is movable lengthwise of the slot and the mounting means by which the saw may be moved longitudinally of the slot is embodied in my co-pending application Serial No. 329,776 hereinbefore mentioned.

The combined work guide or fence and protractor device is mounted for adjustably positioning on the top of the saw table 71 and for adjustment relative to the saw slot. The said device includes an elongated flat bar 68 which is secured by fastening devices 69 to an elongated arm 70. The bar 68 constitutes a guide member. The guide member 68 is adapted to rest on top of the saw table 71 and the arm 70 is provided at its inner end with a boss 72. A vertically disposed pin 73 is mounted in an opening 74 provided in the boss 72 and is secured therein by means of a set screw 75. The opposite ends of the pin 73 are provided with a groove 76 and a head 77. The head 77 is adapted to be extended through the large diameter opening 78 of a keyhole slot which is formed in the table 71. The grooved portion 76 forms a reduced shank inwardly of the head 77 which shank is adapted to engage in the narrow slot 79 forming the keyhole slot.

The bar 70 on the side thereof opposite from the guide member 68 is provided with a right angularly disposed web 80 which at its outer end portion has formed integral therewith an arcuate arm 81. At the junction between the arcuate arm 81 and the outer portion of the arm 70, a pair of upper and lower flanges 82 and 83 are formed integral with the arm 70 and the arm 81. A double end pointer 83ª is secured to the outer faces of the flanges 82 and 83 by means of a fastening member 84.

The guide member or fence 68 is locked in its adjusted position with respect to the table 71 by means of a clamping member 85. The clamping member 85 includes a base block 86 formed with an upwardly offset arm supporting member 87 against which the lower surface of the arcuate arm 81 is adapted to engage. An L-shaped clamp 88 is arranged in superposed relation with respect to the block 86 and is formed of a vertical and a horizontal arm 88ª, 88ᵇ respectively. The lower end of the arm 88ª engages a shoulder 89 formed on the block 86 and the arm 88ᵇ engages the upper surface of the arm 81. The clamp 88 is locked or tightened against the arm 81 by means of a bolt 90 formed with a knurled head 91. The shank of the bolt 90 has a reduced peripherally threaded portion 90ª which has threaded engagement with the wall of an opening 90ᵇ formed in the block 86. The enlarged portion of the shank of the bolt 90 bears against the upper face of the arm 81.

A pointer 92 is mounted over an upwardly extending boss 93, which is carried by the base block 86 and is supported above the boss 93 by means of a spacer 94. A screw or bolt 95 extends through the pointer 92 and the spacer 94 and is threaded into the boss 93. The upper and lower faces of the arm 81 have mounted thereagainst arcuate plates 96 provided with graduations 97. The graduations 97 provide a vernier graduating means by which the fence 68 may be very finely adjusted relative to the table 71. The base member 86 is provided with a right angularly disposed head 98 and a pair of pins 99 are mounted in the head 98 and extend below the lower surface thereof so that the pins 99 may be positioned in a selected pair of holes 100 which are formed in the table 71.

The table 71 at a point midway between each pair of holes 100 is provided with a graduation 101 which is adapted to be correlated with the pointer 83. The terminal ends of the pointer 83 are disposed in a plane intersecting the axis of the pin 73 which is parallel with the front face of the fence or guide member 68.

Preferably the table is provided with a pair of keyhole slots which are spaced apart the desired distance and is also provided with a second arcuate series of holes 100 with graduations 101 between each of the second pair of holes so that the fence or guide 68 may be adjusted lengthwise of the table 71 in a selected one of two positions.

The work guide or fence is adjusted relative to the length of the table by positioning the pin 73 in a selected keyhole slot. The angular position of the guide member 68 relative to the said slot is effected by disposing the pins 99 of the clamping member 85 in a selected pair of openings 100.

The work guide or fence structure in accordance with this invention is exceedingly simple in construction and readily and conveniently adjustable with respect to the said table.

What I claim is:

1. In a saw table having a saw slot, an arcuate series of openings and a keyhole slot coaxial with the arc of said openings; an elongated work guide, a vertical pin carried by one end of said guide having a reduced shank and a head engageable in said keyhole slot, a laterally projecting arcuate arm fixed to said guide, a block engageable with the table, a pair of pins carried by said block engageable with selected pairs of said openings, an L-shaped clamping member on said block, means for exerting pressure on said clamping member for holding said arm in adjusted position relative to said block, an arcuate scale secured to said arm, and an indicator secured to said block, said indicator coacting with said scale whereby said arm may be adjusted relative to said block accurately to a predetermined position.

2. In a saw table having a saw slot, an arcuate series of openings; an arcuate scale coaxial with said openings and a keyhole slot coaxial with the arc of said openings; an elongated work guide, a vertical pin carried by one end of said guide having a reduced shank and a head engageable in said keyhole slot, a laterally projecting arm fixed to said guide, a block engageable with the table, a pair of pins carried by said block engageable with selected pairs of said openings, an L-shaped clamping member on said block, means for exerting pressure on said clamping member for holding said arm in adjusted position relative to said block, a pointer secured to said guide and coacting with said scale roughly indicating the work guide angle with respect to said saw slot, an arcuate scale secured to said arm, and an indicator secured to said block, said indicator coacting with said arcuate scale whereby said arm may be adjusted relative to said block accurately to a predetermined position.

GILBERT J. SELLMEYER.